March 16, 1965 P. B. FREDRICKSON 3,173,212

RULE

Filed March 26, 1962

INVENTOR.
PAUL B. FREDRICKSON
BY
Walter J. Wesendorf Jr.
attorney

United States Patent Office 3,173,212

Patented Mar. 16, 1965

3,173,212

RULE

Paul B. Fredrickson, 675 Brunswick Road, Troy, N.Y.

Filed Mar. 26, 1962, Ser. No. 182,309
5 Claims. (Cl. 33—111)

This invention relates to a rule for use with a magnetic tape recorder to measure linearly the amount of tape remaining on the core of a reel.

An object of this invention is to provide a rule having gradations or markings thereon corresponding to time and footage to thereby indicate linearly the time and footage of tape remaining wound on the core of the reel.

Another object of the invention is to provide a rule having information recording spaces located thereon with leader lines associated therewith whereby after the information is recorded in the spaces provided and the leader lines on the rule are extended to the beginning of the particular data that has been recorded corresponding to the position on the rule, the rule may be used to locate on the tape the place where the particular data was recorded.

A further object of the invention is to provide a rule, made of cardboard covered with paper to permit printing and writing thereon, which is inexpensive to manufacture.

Another object of the invention is to provide a rule that may be filed with each reel of recorded tape to provide an index to the different data recorded.

A still further object of the invention is to provide a rule that can be used in conjunction with two track or four track recording tapes.

These and other objects of the invention should be appreciated from the detailed specification taken in conjunction with the drawings, wherein like reference numerals refer to like parts, in which.

Figure 1:
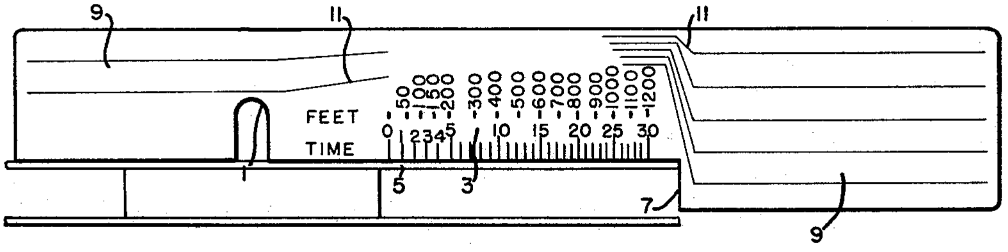
FIG. 1 is an embodiment of the invention for a two track recording tape.

Conventional magnetic tape recorders comprise two spindles, two reels, magnetic tape, and a playing and recording head. Each reel has a core upon which the magnetic tape is either wound or from which the magnetic tape is unwound, an upper flange, a lower flange and an opening or hole which fits upon a spindle. When the reel is seated upon its spindle, the upper flange so called is exposed to view. In recording, magnetic tape is unwound from the core of the first reel, passes through the playing and recording head where voice, music, etc. is recorded on the magnetic tape, and then the recorded magnetic tape is wound on the core of the second reel which is being rotated. After recording is complete, the magnetic tape is rewound on the core of the first reel being rotated or driven while at the same time the magnetic tape is being unwound from the core of the second reel. The magnetic tape after being rewound on the first reel is ready for playback. In playback the operation of the spindles is the same as was described in recording except that the playing and recording head reproduces the voice, music, etc. which was initially recorded on the magnetic tape. The upper and lower flanges have flat sides which are integral and coplanar extensions of the lateral terminal portions of the core periphery. The flat sides of these flanges generate circular areas coincidental with the core. The circumferential bounds of these circular areas may be referred to as peripheral edges. With a reel emplaced on a spindle and when one looks in a direction normal to the spindle and coplanar with the plane of the upper flange of the reel, he will observe that an upper terminal portion of the spindle extends a short vertical distance above the upper flange of the reel. The rule in this invention is described as having, as an example 1200 feet of magnetic tape wound on the core of the reel.

The description of the invention for use with a certain type of spindle and reel does not of course limit the scope of this invention. The rule may be complementally configured for use with spindles and reels of different configurations, such complemental configurations of the rule being within the scope of the invention.

With reference to the previous description of a conventional tape recorder, the description of the rule structurally constituting this invention is with reference to the arrangement and disposition of the rule coplanar with any plane which passes normal to the flat side of the reel's upper flange and through the center of the spindle along its longitudinal axis. The rule has cutout portion 1 which is complemental or fits the configuration of that upper terminal portion of the spindle exposed above the upper flange of the reel. Arranged on the rule are gradations or markings 3 designating time in minutes and footage of the magnetic tape wound on the core of the reel. The gradations 3 are so arranged that the time in minutes and footage of the magnetic tape are indicated linearly. Zero time and zero footage gradations commence on the rule at the position which corresponds to the periphery of the core of the reel whereon the magnetic tape commences to be wound. When the cutout portion 1 is emplaced upon that upper terminal portion of the spindle exposed above the flat side of the upper flange of the reel, the lower portion 5 will fit upon the flat side of the upper flange of the reel because the lower portion 5 is structurally configured to extend normal to the spindle at that point on the spindle whereat a plane passing through the spindle coplanar with the flat side of the upper flange would cut the spindle. A portion 7 depends from lower portion 5 in normal relationship therewith at the point on lower portion 5 which is the same distance from the center of cutout portion 1 as is the radial distance measured from the center of the spindle to the peripheral edge of the flat side of the upper flange of the reel. Hence portion 7 will abut the peripheral edge of the flat side of the upper flange of the reel. Therefore the rule with its cutout portion 1, lower portion 5 and depending portion 7 will be complemental or be in abutting relationship to that cross sectional portion of the exposed spindle and that radial portion of the upper flange of the reel which remain when cut by any place passing through the center of the spindle along its longitudinal axis and normal to the flat side of the upper flange of the reel.

On the side of cutout portion 1 and the other side of the gradations 3 are arranged six information recording spaces 9 for each tape track. In these spaces 9 data such as data recording, subject matter recorded, etc. may be written. A leader line extends from each space 9.

Figure 2:
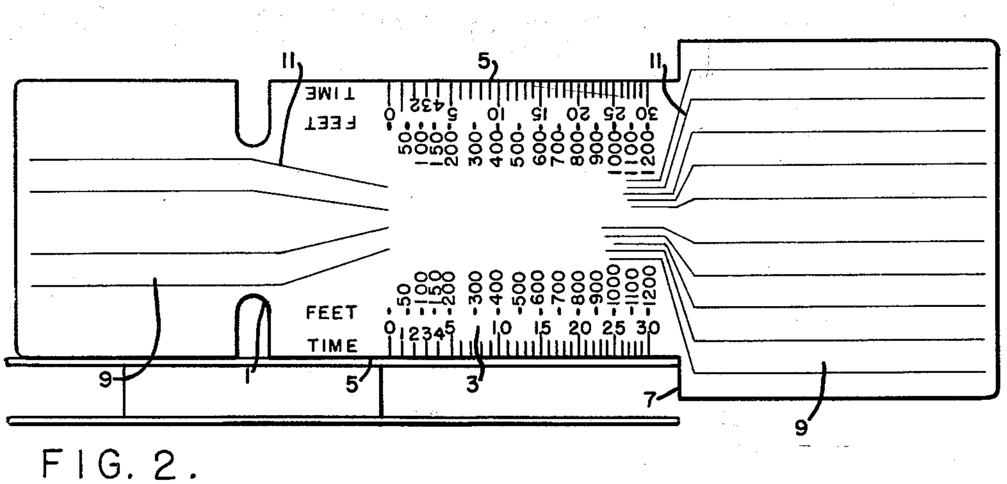
FIG. 2 is an embodiment of the invention for a four track recording tape.

Inasmuch as the back sides of the rules shown in FIGS. 1 and 2 are the same as the front sides of same, only the front sides are depicted.

The operator in using the rule should first have endorsed on the rule preferably to the left of cutout portion 1 a number corresponding to the track of the tape. The operator indexes the data recorded on the tape by placing the rule in position and extending the leader line of a space 9 to the feet and time position where the particular data was first recorded. Whether or not the operator will fill in the space before or after the indexing of the recorded data is left to the operator's option.

The two spaces 9 to the left of cutout portion 1 should be used for recorded data that is initially rewound on the core of the left reel while the four spaces 9 to the right of gradations 3 should be used for data initially recorded and later rewound on the core of the left reel for playback.

Having thusly described my invention, I claim:

1. A rule for use with magnetic tape wound on the core of a reel of a conventional tape recorder to indicate linearly time and footage remaining thereon of said magnetic tape and to locate particular data recorded on said magnetic tape, said reel being emplaced upon an upright spindle whose upper terminal portion is exposed above the flat side of the upper flange of said reel of circular shape circumferentially bounded by a peripheral edge; said rule comprising a cutout portion, lower portion and depending portion structurally configured to snugly fit against that cross sectional portion remaining of said exposed upper terminal portion, the radial portion of said upper flange of said reel and its peripheral edge, respectively, when any plane passes through the center of said spindle along its longitudinal axis and normal to the flat side of the upper flange of said reel, said rule having first means and second means, said first means indicating linearly time and footage of magnetic tape remaining on the core of said reel and said second means being utilized with said first means to locate particular data recorded on said tape.

2. The subject matter as claimed in claim 1, wherein said first means comprise gradations on said rule designating time and footage of magnetic tape.

3. The subject matter as claimed in claim 1, wherein said second means comprise information recording spaces and leader lines extending therefrom.

4. The subject matter as claimed in claim 3, wherein said first and second means are on both sides of said rule for utilization of said rule for magnetic tapes of two tracks.

5. The subject matter as claimed in claim 3, wherein said rule structure is of symmetrical configuration and said first and second means are on both sides of said rule for utilization of said rule for magnetic tapes of four tracks.

References Cited by the Examiner

UNITED STATES PATENTS

| | | | |
|---|---|---|---|
| 1,601,407 | 9/26 | Murray | 33—169 X |
| 2,802,290 | 8/57 | Carey. | |
| 2,937,818 | 5/60 | Zorn | 33—111 X |

ISAAC LISANN, *Primary Examiner.*